No. 880,073. PATENTED FEB. 25, 1908.
O. GUNDERSON.
MILK WEIGHING MACHINE.
APPLICATION FILED MAR. 19, 1906.

5 SHEETS—SHEET 1.

Witnesses
Jos. H. Blackwood
T. H. Randolph Jr.

Inventor
Ole Gunderson
By D. A. Gourick
Attorney

No. 880,073.

PATENTED FEB. 25, 1908.

O. GUNDERSON.
MILK WEIGHING MACHINE.
APPLICATION FILED MAR. 19, 1906.

5 SHEETS—SHEET 2.

Witnesses
Jos. H. Blackwood
J. H. Randolph, Jr.

Inventor
Ole Gunderson
By D. A. Gourick
Attorney

No. 880,073.  
PATENTED FEB. 25, 1908.
O. GUNDERSON.  
MILK WEIGHING MACHINE.  
APPLICATION FILED MAR. 19, 1906.
5 SHEETS—SHEET 3.
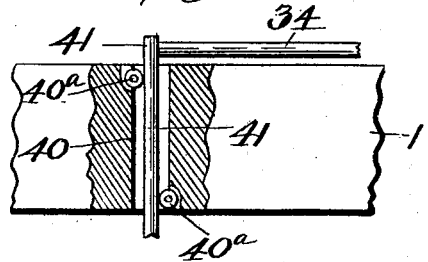
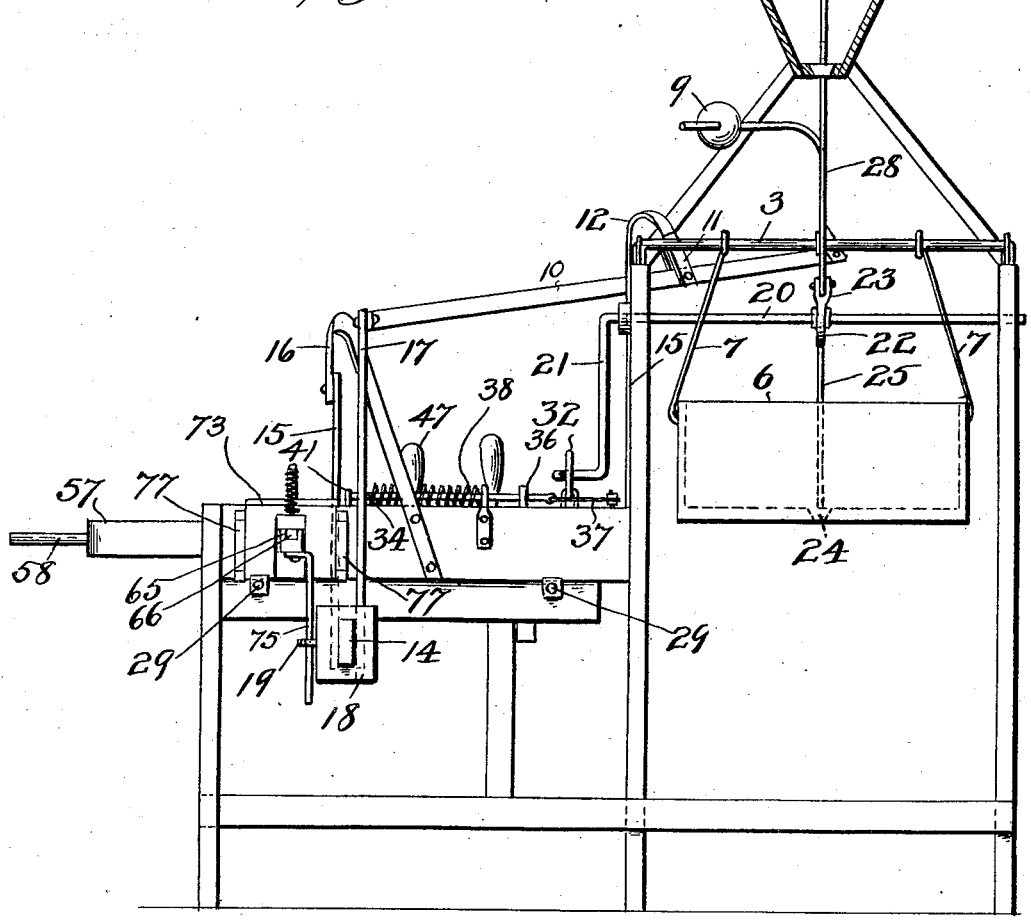
Witnesses  
Inventor  
Ole Gunderson  
By D. A. Gowrick  
Attorney No. 880,073. PATENTED FEB. 25, 1908.
O. GUNDERSON.
MILK WEIGHING MACHINE.
APPLICATION FILED MAR. 19, 1906.

5 SHEETS—SHEET 4.

No. 880,073. PATENTED FEB. 25, 1908.
O. GUNDERSON.
MILK WEIGHING MACHINE.
APPLICATION FILED MAR. 19, 1906.

5 SHEETS—SHEET 5.

UNITED STATES PATENT OFFICE.

OLE GUNDERSON, OF BRISTOL TOWNSHIP, WORTH COUNTY, IOWA.

MILK-WEIGHING MACHINE.

No. 880,073.　　　Specification of Letters Patent.　　　Patented Feb. 25, 1908.

Application filed March 19, 1906. Serial No. 306,931.

*To all whom it may concern:*

Be it known that I, OLE GUNDERSON, a citizen of the United States, residing in Bristol township, in the county of Worth and State of Iowa, have invented certain new and useful Improvements in Milk-Weighing Machines, of which the following is a specification.

In creameries it is the custom to return to the dairyman bringing milk his share of the separated milk or milk from which the butter fat has been extracted for stock feeding or other uses. This has been accomplished in many ways. In my invention is provided an automatically operated weighing machine for giving to the dairyman his share of separated milk the operation of which is controlled by means of checks or tokens given to him by the butter maker. The number and size of the tokens or checks being controlled by the quantity of butter fat extracted from the milk sold by the dairyman.

The construction and operation of my invention will be described in detail hereinafter and illustrated in the accompanying drawings in which—

Figure 1:
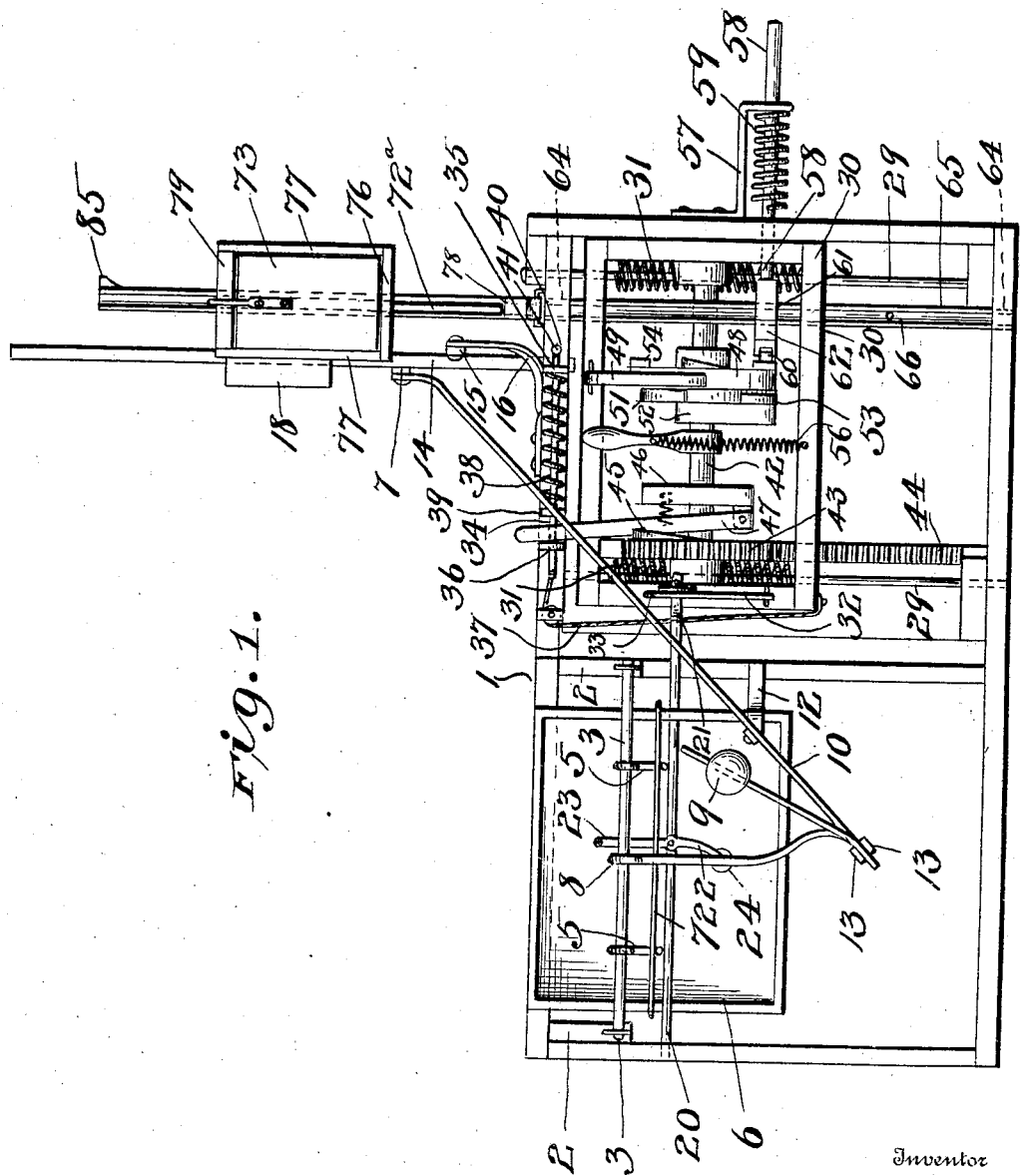
Figure 2:
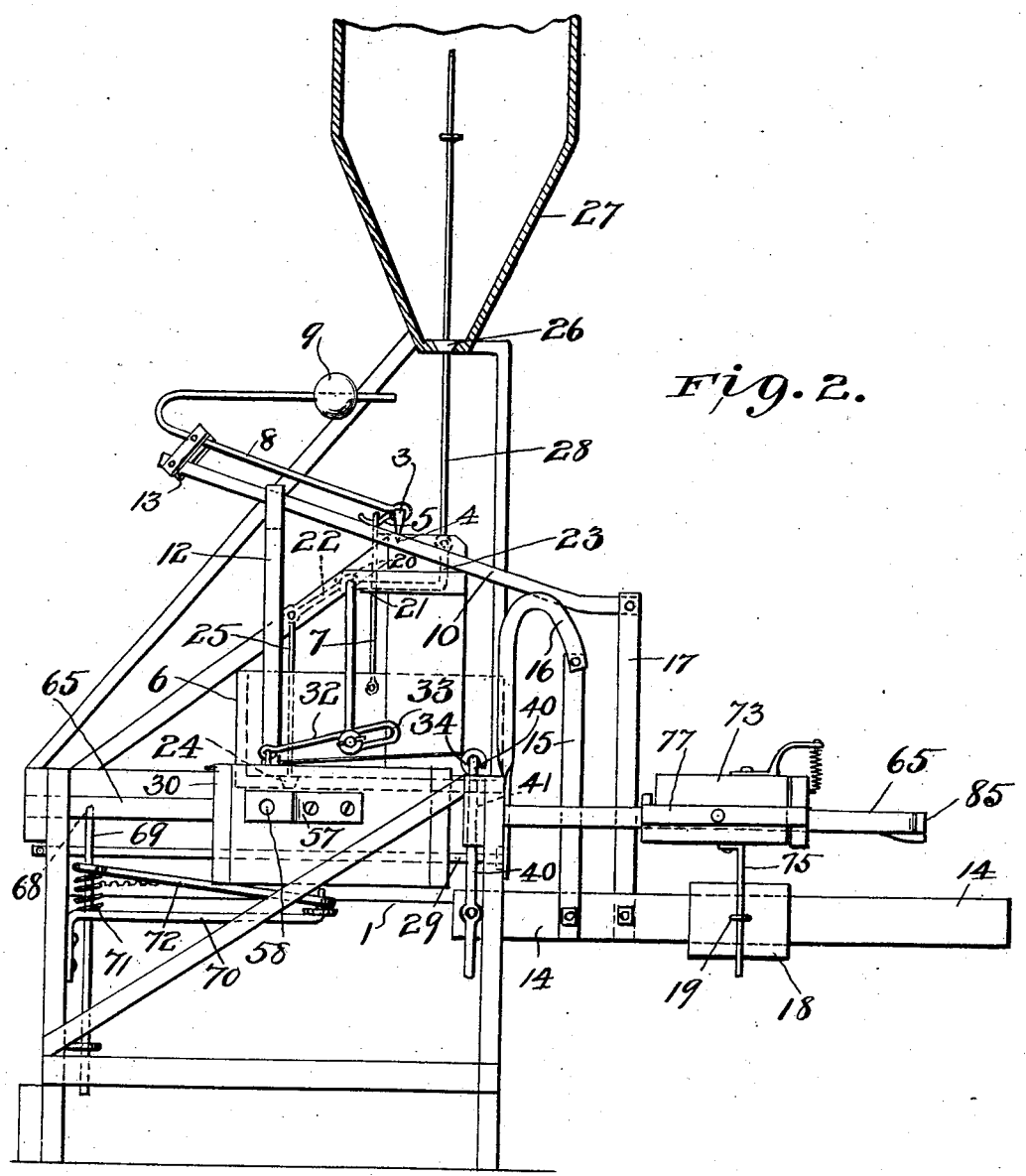
Figure 4:
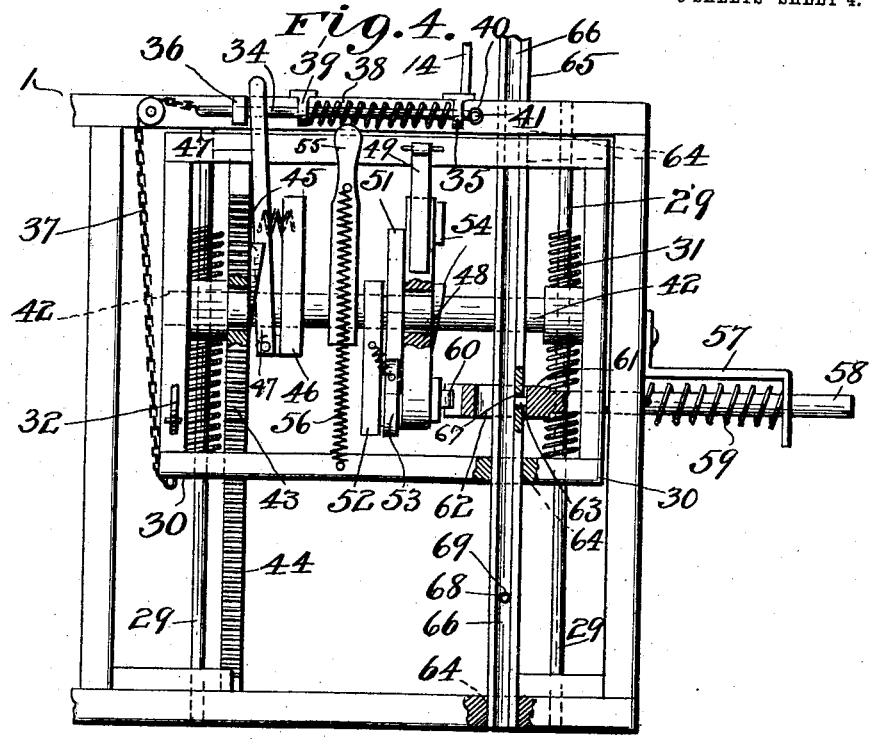
Figure 5:
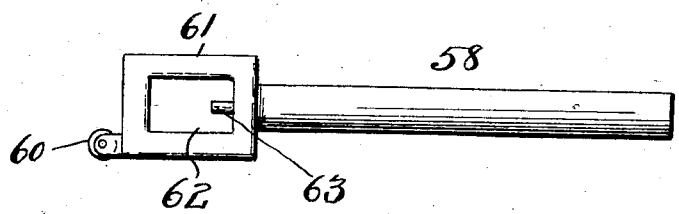
Figure 6:
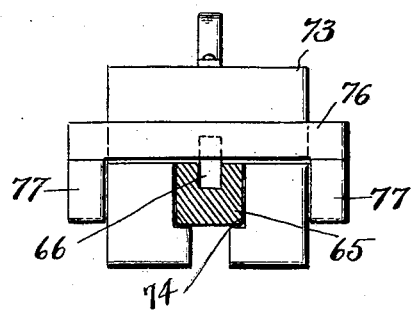
Figure 7:
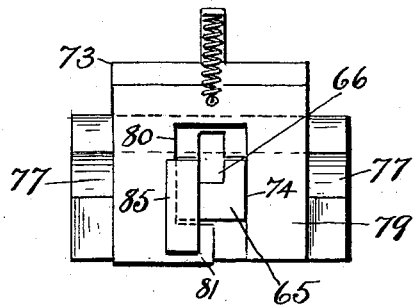
Figure 8:
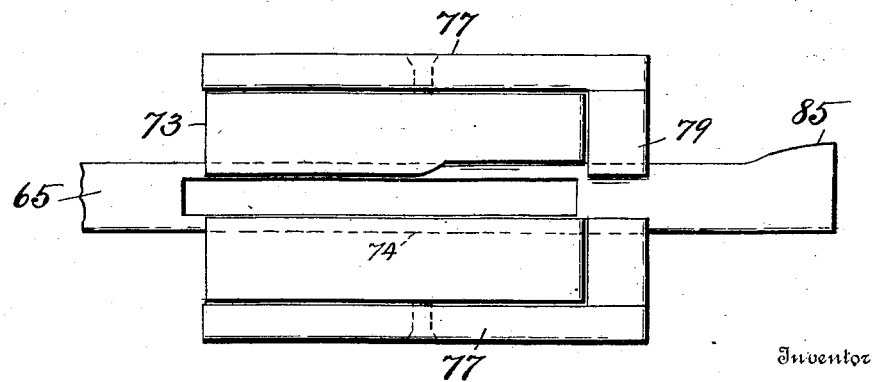

Figure 1 is a top plan view of my improved weighing machine, Fig. 2, a side view, Fig. 3, a rear view, Fig. 4, an enlarged plan view of a fragment of the device showing the sliding frame, the grooved slide, and operating parts, Fig. 5, a detail view of the rod for stopping the slide, Fig. 6, a front view of the weight shifting box and cross section of slide, Fig. 7, a rear view of the box and slide, Fig. 8, a bottom view, and Fig. 9, an enlarged view partly in section of a fragment of the frame showing the antifriction bearings for the pin 41.

In the drawings similar reference characters indicate corresponding parts throughout the several views.

The frame 1 of my improved machine is adapted to rest upon any suitable base and has uprights 2 on which is pivotally mounted a balance beam 3 by means of knife blade edges.

5 indicate hooks secured to balance beam
3 from which is hung a receiving basin 6 by means of a chain or other flexible element 7. An arm 8 is secured to beam 3 having its free end bent back on itself and provided with an adjustable counter-weight 9.

10 indicates a lever fulcrumed on links pivotally secured to upright 12 secured to frame 1. Arm 8 is connected to one end of lever 10 by means of links 13 so that when the basin 6 is depressed the arm 8 secured to balance beam 3 depresses the end of the lever to which it is secured.

14 indicates a scale beam fulcrumed on arm 15 depending from support 16 secured to frame 1 and connected to lever 10 by means of rod 17.

18 indicates the balance weight slidably mounted on scale beam 14 and having a staple or eyebolt 19 secured thereto.

20 indicates a rock shaft journaled on uprights 2 having one end formed with a crank 21 and arms 22 and 23 secured thereto. Arm 22 is connected with valve 24 in the bottom of receiving basin 6 by means of rod 25, while arm 23 is connected with valve 26 in creamery tank 27 by means of rod 28.

29 indicates guide rods secured in frame 1 on which is slidably mounted a box-like frame 30, coil springs 31 being secured to said rods and bearing against the frame 30 to normally hold said frame towards the front of frame 1.

32 indicates a rod pivotally secured to frame 30 and having an elongated loop 33 on its free end which is mounted on crank 21. When the box-like frame 30 is in its normal position at the front of frame 1 crank 21 is turned by rod 32 so that valve 24 is raised to allow the contents of basin 6 to flow out while valve 26 closes the opening in creamery tank 27. When the frame 30 is moved towards the rear of frame 1 by the instrumentalities to be described hereinafter the position of valves 24 and 26 are reversed so that basin 6 receives and holds the milk from creamery tank 27.

34 indicates a rod slidably mounted in guides 35 and 36 on frame 1 and connected by means of a chain or other flexible element 37 with frame 30.

38 indicates a coil spring secured to rod 34 and bearing against guide 35, and 39 a lug on said rod 34.

40 indicates a pin slidably mounted in hole 41 in frame 1 and secured to the rear end of scale beam 14, said pin being adapted to engage the end of rod 34 when drawn against the resistance of spring 38 by the forward movement of frame 30 and hold the rod 34 in said position.

40ª indicates antifriction rollers journaled in hole 40.

42 indicates a shaft journaled in frame 30 and having loosely mounted thereon a gear wheel 43 that meshes with rack-bar 44 secured to frame 1 and having a projection or lug 45 on its side.

46 represents an arm secured to shaft 42 and having a spring actuated lever pawl 47 fulcrumed thereon and adapted to be engaged by lug 45 to rotate shaft 42 when the frame 30 is moved backwards, as hereinafter described, and when the frame 30 is at the back of frame 1 lever pawl 47 engages lug 39.

48 indicates a ratchet wheel loosely mounted on shaft 42 and 49 a gravity pawl pivotally secured to frame 30 to engage the teeth 50 on the periphery of ratchet wheel 48.

51 indicates a smaller ratchet secured to wheel 48 and 52 an arm secured to shaft 42 and having a spring actuated pawl 53 secured thereto and adapted to engage the teeth of ratchet 51.

54 indicates lugs on the side of ratchet wheel 48.

A lever arm 55 is secured to shaft 42 and connected with the frame 30 by means of coil spring 56.

An angular bracket 57 is secured to the end of frame 30 and has a bar 58 slidably mounted therein and in the end of frame 30. 59 indicates a coil spring secured to bar 58 and bearing against bracket 57 to hold the inner end of said bar 58 in engagement with the side of wheel 48 and lugs 54, the end of said bar being provided with a roller 60. Adjacent to the end of bar 58 is an enlarged portion 61 having a hole 62 therethrough and with a teat 63 projecting into the hole.

Holes 64 are formed in frames 1 and 30 in alinement with hole 62 and a rod 65 is slidably mounted therein having a longitudinal groove 66 in its upper surface, and a hole 67 in its side to receive teat 63. A hole 68 is also provided in its bottom surface to receive a pin 69 slidably mounted in bracket 70 secured to frame 1. Pin 69 is projected by means of coil spring 71 and held in hole 68.

72 indicates an inclined bar having one end secured to bracket 70 while its other end is formed with an eye to receive pin 69 and bearing against the upper end of coil spring 75.

The purpose of grooved rod 65 is to receive a check or token 72$^a$ to operate the weighing machine. The check or token varies in length according to the quantity of separated milk to which the dairyman may be entitled proportioned to the amount of butter fat contained in the milk taken to the creamery for separation. After placing the check or token 72$^a$ in groove 66, the rod and token are pushed backwardly. The teat 63 engages hole 67 therein so that the box-like frame 30 is carried backwards. As the frame 30 moves backward the gear wheel 43 meshing with rack-bar 44 and the lug 45 thereon engaging pawl 47 the shaft 42 is turned so that lever-arm 55 is swung against the resistance of spring 56 and arm 52 and spring-actuated pawl 53 are turned on ratchet 51 so that pawl 53 eventually engages one of the teeth thereof at the extremity of its stroke, the wheel 48 being held from rotation by means of gravity pawl 49. Finally the hole 68 reaches pin 69 which entering the hole stops farther progress of the rod 65 towards the back part of the frame 1 and prevents the box-like frame from going any farther backwards. As stated above when the frame 30 is propelled backwards the valve 24 in the receiving basin is closed while the valve 26 in the creamery tank is opened, also that when the frame reaches its farthermost backward position lever pawl 47 engages lug 39 on rod 34. As soon as the amount of milk in the basin 6 is sufficient to overcome the weight of balance weight 18 and lift scale beam 14 the pin 40 is drawn downward from engagement with the end of rod 34 which under the impulse of spring 38 is propelled so that lug 39 moves lever pawl 47 out of engagement with the lug 45 on the side of gear wheel 43 thus releasing shaft 42 to the action of coil spring 56, which acting through lever arm 55 rotates the shaft 42 in a reverse direction, and, through the instrumentality of pawl 53 and ratchet 51, rotating ratchet wheel 48. As ratchet wheel 48 rotates the lugs 54 engaging roller 60 on the end of bar 58 pushes teat 63 from hole 62. When so released the frame 30 is returned towards the front portion of frame 1 under the impulse of spring 31. When frame 30 reaches inclined bar 72 it is depressed thus pressing the spring 71 and pin 69 downward so that rod 65 is released from engagement with said pin and may be returned to its normal position for another weighing operation. When the frame 30 returns to its original position at the front of the machine shaft 20 is rocked by rod 32 so that valve 24 is opened to empty receiving basin 6, while valve 26 in the creamery tank is closed to prevent the separated milk from flowing into the basin.

At the time the frame 30 reaches the front of frame 1 the chain 37 draws rod 34 back against the resistance of spring 38 thus exposing the hole 41 in frame 1 and permitting pin 40 to project therefrom and against the end of said rod 34 so as to hold it and lug 39 in position to again engage the lever pawl 47.

In order to determine the amount of milk necessary to cause the operation of the structure above described I provide a block 73 having a guide way 74 open at its lower side to receive rod 65, said block having a pin 75 thereon to fit into staple or eyebolt 19 on balance weight 18, so that the position of block 73 relative to frame 1 controls the position of the balance weight on scale beam 14. The position of block 73 is controlled by the length of the check or token 72$^a$ as follows:

The check or token 72ª is slid along groove 66 until it finally emerges through hole 64 in the back of frame 1 where it engages crossbar 76, secured to the ends of arms 77 pivotally secured to the sides of block 73 and pushes said block back until stop 78 pivotally secured to frame 1 drops behind and engages the rear end of the check or token when the block 73 will be in the correct position to set weight 18 so as to give the correct amount of milk to the dairyman.

79 represents a cross piece secured to the ends of arms 77 at the rear of block 73 having a slot 80 therein to receive the rod 65 and lug 81 extending partway under the rod 65 to engage a projection 82 at the rear end of said rod to depress the rear ends of arms 77 and raise the cross-bar 76, when the rod 65 is drawn forward, as above stated, at the completion of a weighing operation, and allow the check or token 72 to drop through opening 83 at the rear end of rod 65.

84 indicates a coil spring to normally hold cross-piece 79 upward so that cross-bar is in position to be engaged by checks or tokens 72, and 85 a stop on the end of rod 65.

Having thus described my invention what I claim is—

1. In a fluid weighing machine, a token-controlled apparatus for controlling the passage of the fluid to and from said machine consisting of means for receiving the token, a frame slidably mounted on said means, and operative connections between said frame and the fluid controlling means, substantially as shown and described.

2. In a fluid weighing machine, valves for controlling the passage of the fluid to and from the machine, a token controlled apparatus for controlling the operation of said valves comprising a rod, a token slidably mounted on the rod, a frame slidably mounted on the rod, operative connections between the valves and frame, and means to actuate the frame, substantially as shown and described.

3. In a fluid weighing machine, valves for controlling the passage of the fluid to and from the machine, a rock shaft for actuating said valves, a token controlled apparatus comprising a grooved rod, a token slidably mounted in the groove in the rod, a frame slidably mounted in the rod, a rod connecting the frame with the rock shaft, and means to actuate the frame, substantially as shown and described.

4. In a check controlled apparatus, a grooved rod slidably mounted, a spring actuated frame slidably mounted on said rod, a shaft journaled in said frame, means to actuate said shaft, a bar slidably mounted on the spring actuated frame and adapted to engage the grooved rod, and operative connections between shaft and bar to disengage it from the grooved rod, substantially as shown and described.

5. In a check controlled apparatus, a grooved rod slidably mounted, a spring actuated frame slidably mounted on said rod, a shaft journaled in said frame, a spring actuated lever arm secured to said shaft, a bar slidably mounted on the spring actuated frame and adapted to engage the grooved rod, a ratchet wheel loosely mounted on the shaft and having projections thereon to engage the bar, and a pawl to engage said ratchet wheel secured to the shaft, substantially as shown and described.

6. In a check controlled apparatus, a grooved rod slidably mounted, a spring actuated frame slidably mounted on said rod, a shaft journaled in said frame, means to rotate said shaft, a bar slidably mounted on the frame and adapted to engage the grooved rod, a ratchet wheel loosely mounted on the shaft and having projections thereon to engage said bar to disengage it from the grooved rod, a pawl to engage said ratchet wheel secured to the shaft, a gear wheel loosely mounted on the shaft, and having a projection on its side, a spring pawl secured to the shaft to engage the projection on the gear wheel, and a gear rack meshing with said gear wheel, substantially as shown and described.

7. In a check controlled apparatus, a grooved rod slidably mounted, a spring actuated frame slidably mounted on the grooved rod, a spring actuated frame slidably mounted on the grooved rod, a spring actuated bar slidably mounted in said frame and adapted to engage said grooved rod, a shaft journaled in said frame, a spring actuated lever arm secured to said shaft for rotating it, a ratchet wheel loosely mounted on said shaft and provided with lugs or projections to engage the spring actuated bar and release it from engagement with the grooved rod, a spring actuated pawl secured to the shaft to engage said ratchet wheel, a gear wheel loosely mounted on the shaft, a projection on said wheel, a lever pawl secured to the shaft and adapted to engage the projection on the gear wheel, a rack bar meshing with said gear wheel, a spring actuated rod operatively secured to said frame, a lug on said rod to engage the lever pawl and release it from engagement with the projection on the gear wheel, a pin to hold said spring actuated rod in an inoperative position, and means to actuate said pin to release the rod to the influence of its actuating spring, substantially as shown and described.

OLE GUNDERSON.

Witnesses:
BERNT M. HOLSTAD,
AME M. HOLSTAD.